May 10, 1938.                 W. E. BASSETT                      2,116,692
                           GEAR SHIFTING MECHANISM
                            Filed July 13, 1936              3 Sheets—Sheet 1
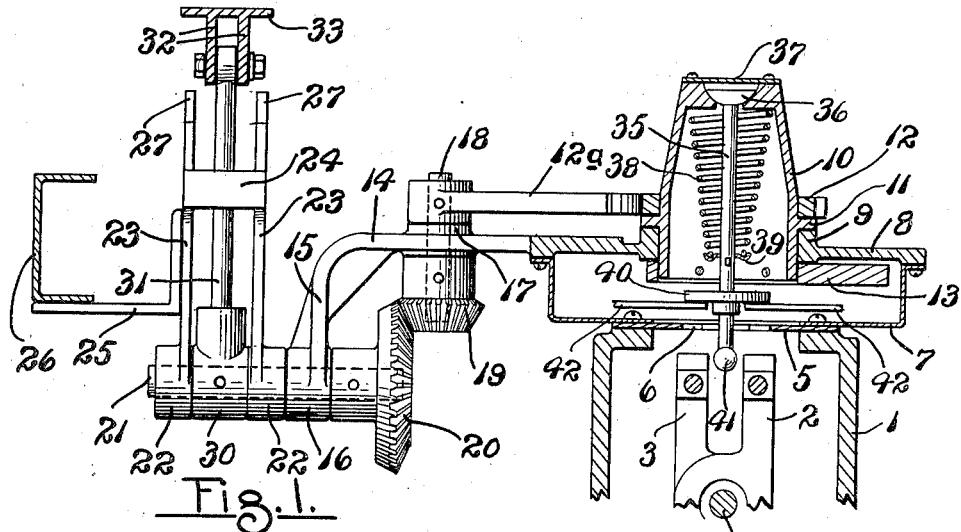
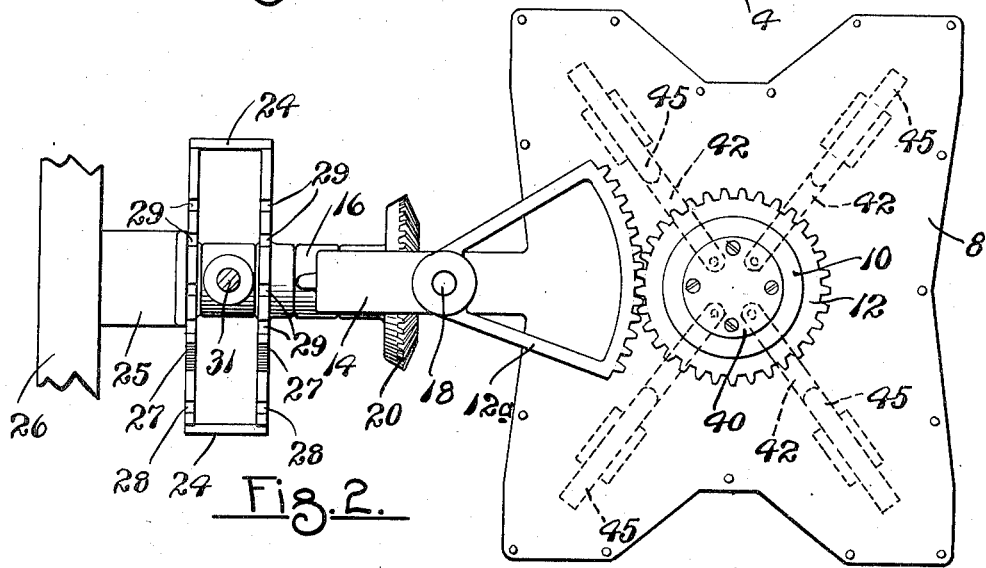
Inventor
Walter E. Bassett
By Liverance and
Van Antwerp
Attorneys

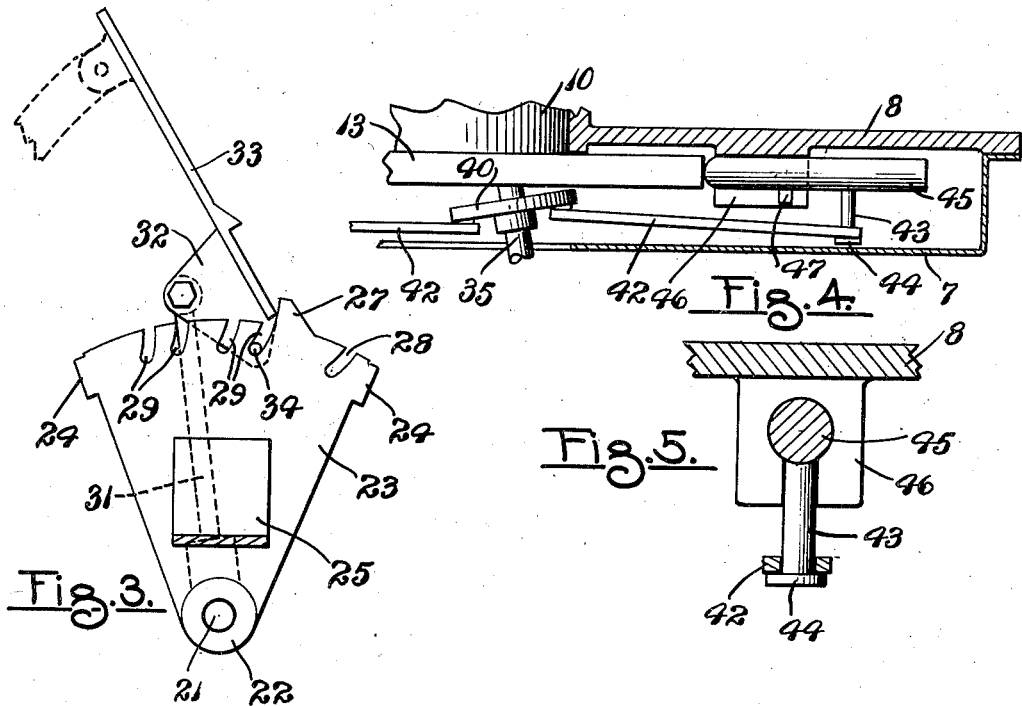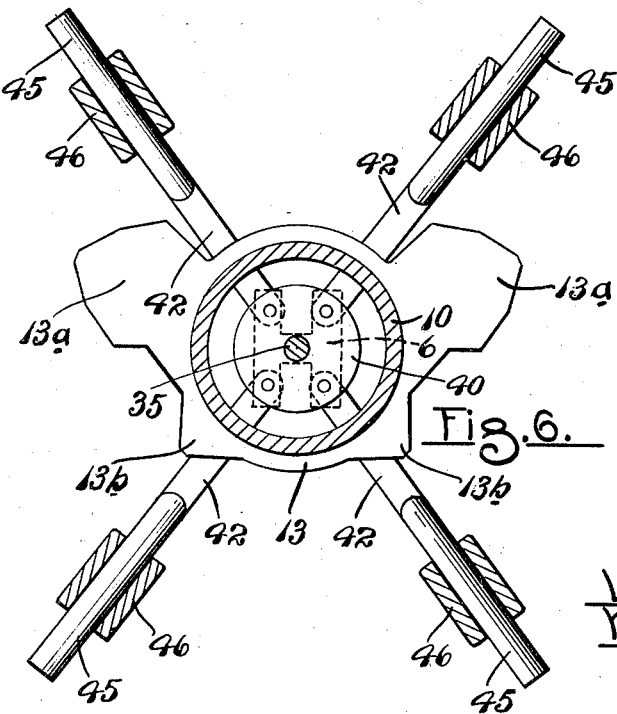

May 10, 1938. W. E. BASSETT 2,116,692
GEAR SHIFTING MECHANISM
Filed July 13, 1936 3 Sheets-Sheet 3
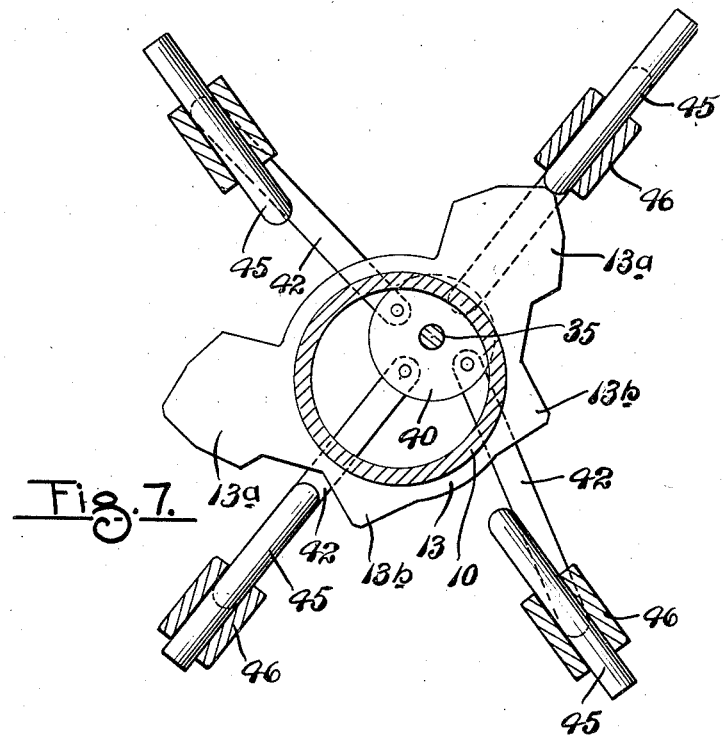
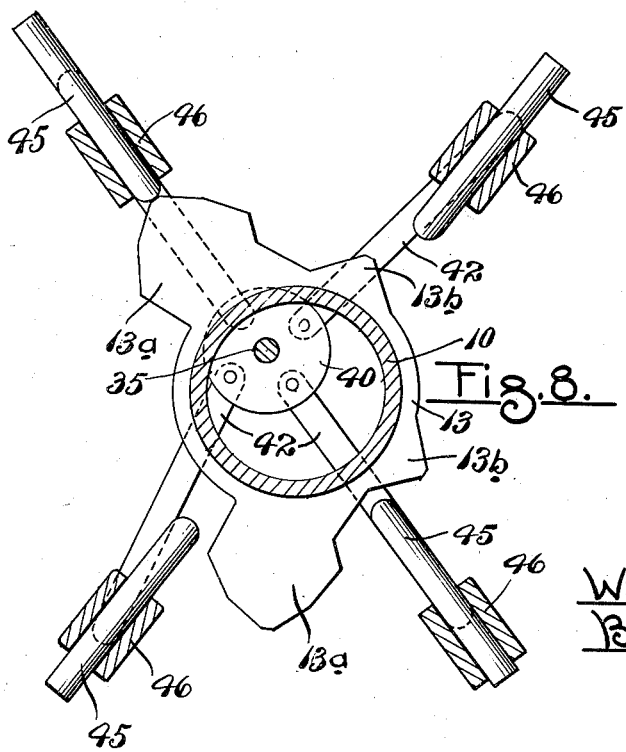
Inventor
Walter E. Bassett
By Liverance and Van Antwerp
Attorneys Patented May 10, 1938

2,116,692

UNITED STATES PATENT OFFICE 2,116,692

GEAR SHIFTING MECHANISM

Walter E. Bassett, Grand Rapids, Mich.

Application July 13, 1936, Serial No. 90,326,

12 Claims. (Cl. 74—474)

This invention relates to gear shifting mechanism for use in selecting and changing gears in transmission, particularly such as are utilized in motor vehicles.

The ordinary motor vehicle transmission is disposed between the crank shaft of the engine and the propeller shaft of the motor vehicle. Usually there are three speeds forward and one reverse. That is, the crank shaft may be directly connected to the propeller shaft, this being the "high" speed, sometimes called the "third" speed, and there is other gearing which may be operated so that the speed of the propeller shaft in proportion to that of the engine crank shaft is lowered, one of the speeds being known as the "intermediate" or "second" speed and the other as the "low or "first" speed. In the latter case the rotation of the propeller shaft compared with that of the crank shaft is lower than its rotation in "intermediate", while the rotation at "intermediate" speed is lower than when the crank and propeller shafts are directly connected as in "high" or "third" speed. In the "reverse" speed, the propeller shaft is rotated in a direction opposite to the rotation of the crank shaft and at a speed considerably lower.

A much used method of shifting gears in practice is to use a hand lever which may be selectively connected with either of two slidably mounted forks in the transmission gear case, the lever being movable both forward and backward from a central position so that the two movements, forward and backward of the two forks, provides the four selections of speed. The hand lever is located at the central portion of the front or driving compartment of the motor vehicle and is in the way.

With my invention it is designed that a selection and operation of the gear shifting in the transmission may be performed by a foot pedal which may be either a separate pedal or may also serve as a means for operating the clutch pedal so as to connect or disconnect the clutch which is interposed in the length of the engine crank shaft between the engine and the transmission gearing.

The invention which I have made comprises many novel constructions, organizations of elements and arrangements of parts for practically and effectively attaining selective gear shifting and with the elimination of the centrally positioned hand lever so that substantially all of the space in the front or driving compartment of the motor vehicle is free and unobstructed.

An understanding of the invention may be had from the following description, taken in connection with the accompanying drawings, in which, Fig. 1 is a partial elevation and transverse vertical section illustrating the foot pedal operation of the gear selection and shifting of my invention.

Fig. 2 is a plan view of the structure shown in Fig. 1.

Fig. 3 is a side elevation illustrating the selector pedal and further indicating the manner in which it may be used as a clutch pedal.

Fig. 4 is a fragmentary enlarged section at one side of and through the mechanism mounted immediately above the transmission casing.

Fig. 5 is a fragmentary enlarged elevation illustrating the sliding mount of one of the operating members all of which are connected to a gear shifting rod.

Fig. 6 is a fragmentary horizontal section and plan showing the operating cam member which is used to perform the immediate shifting of a selected gear, said cam member being in neutral position, and Figs. 7 and 8 are similar views showing the cam member actuated to put selected gears into operative position.

Like reference characters refer to like parts in the different figures of the drawings.

The transmission casing 1 may be of usual form having within it a sliding gear transmission built to have three speeds forward and one reverse, the specific construction of which is familiar to all skilled in the art and need not here be illustrated or described. Two forks 2 and 3 are slidably mounted on a suitable longitudinal rod or shaft 4 and are operatively connected in well known manner with the sliding gears, and have U-shaped recesses at their upper ends which in the present day sliding gear transmissions receive the lower end of the gear shift lever, which is manually operated. The upper side of the transmission casing 1 is partly open particularly over its central portion, the opening being covered by a plate 5 in which is a guiding H-shaped slot 6, which is used to guide the shifting rod in its movement when it operates the slidable forks 2 and 3 either in forward or backward direction.

With my invention a casing 7, which may be of sheet metal, is provided in the form of a relatively shallow pan the same being covered by a cast metal cover 8 secured thereto in any suitable manner and which, at its central portion, has an opening surrounded by a bearing hub 9. A hollow housing member 10 extends through the opening and is rotatable in the bearing 9 and is provided with an outwardly extending annular flange 11 which rests upon the upper end of said hub bearing 9. A gear 12 is permanently secured to the member 10 preferably directly over the flange 11 as shown. At the lower end of the housing member 10 and below the plate 8 an operating cam member 13 is permanently secured, the specific structure and operation of which will be hereafter described.

From one side of the plate 8 an integral, horizontal arm 14 extends which is turned in a downward direction as at 15 terminating in a bearing sleeve 16. The horizontal arm 14 has a vertical bearing 17 through which a short shaft 18 passes and is rotatably mounted, having a segmental gear 12a secured at its upper end, the teeth of which mesh with the gear 12 previously described. A beveled pinion 19 is fixed at the lower end portion of the shaft 18 and is in engagement with a beveled gear 20 secured at the inner end of a shaft 21 which extends through the bearing sleeve 16 and two spaced apart bearings 22 at the lower ends of two spaced apart side plates 23 which are connected together at their front and rear by cross ties 24, one of said plates 23 being mounted upon a bracket 25 which in turn has a permanent connection to the adjacent chassis side frame member 26 of the motor vehicle frame.

The plates 23 are of substantially triangular form, curved at their upper edges in the arc of a circle having as a center the axis of the shaft 21. The two plates 23 each has at its upper edge and a short distance ahead of its rear portion an upwardly extending lug 27 integral therewith. Back of the lug 27 in each of the plates is a downwardly and forwardly curved slot 28 while in front of the lug 27 are four spaced apart downwardly and forwardly curved slots 29, the corresponding slots in opposite plates being directly opposite each other. On the shaft 21, between the two bearings 22, a member 30 is secured, through which the shaft passes, from which a rod 31 extends upwardly between the plates 23, and at its upper end, is pivotally connected to and lies between two spaced apart downwardly extending ears 32 which are formed integral with a foot pedal 33. The two ears 32 at their rear lie between and at the inner sides of the plates 23 and are each provided with an outwardly extending pin 34 to be selectively seated in any of the slots 28 or 29. It is evident that by tilting the foot pedal 33 (Fig. 3) so as to turn it in a counterclockwise direction about its pivotal connection to the rod 31, the pins 34 may be elevated above the upper edges of the plates 23, whereupon the pedal with the connected rod 31 may be moved to bring the pins 34 into a position where they may enter any other selected oppositely positioned slots 29 in the upper edge of the plates 23; and that when this is done the shaft 21 is rotated with a resultant rotation of the member 10 and the cam member 13 connected at its lower end. As indicated in dotted lines in Fig. 3, the front or upper end of the foot pedal 33 may be connected to the member on which the usual foot operated clutch pedal is mounted. It will be evident that the clutch pedal may be operated to release the clutch by merely turning the pedal 33 in a counterclockwise direction about its pivotal connection to the upper end of the rod 31 this being all of the movement of the pedal 33 for clutch release when a selected connection of gears is operating.

The hollow housing 10 is of a form similar to that in which the present manually operable gear shift lever is mounted. With my invention a shifting rod 35 is provided at its upper end with a head 36 which is the segment of a sphere so that the rod may be rocked in any direction away from its normal vertical position by reason of a suitable socket in which the head 36 is received. The head 36 and the socket in which it is mounted are covered by a cover plate 37. A relatively strong conical coiled spring is mounted within the housing 10 with its larger and upper end bearing against the upper end of the housing and with its lower end bearing against a suitable plate 39 located around and upon the rod 35.

The rod 35, a short distance below the lower end of the housing 10, has a circular disk 40 secured thereto and extends below said disk and through the H slot 6 terminating in a ball 41 which is located so that on lateral movement it may enter the recesses in the upper ends of the shifting forks 2 and 3.

Four rods 42 are loosely connected by any suitable universal joint connection at their inner ends to the underside of the disk 42 and extend radially outward therefrom at proper spaced apart intervals. As shown in Fig. 4 each bar 42 at its outer end has a vertical pin 43 passing loosely through an opening in the bar 42, each pin 43 having a head 44 at its lower end upon which its associated bar rests. The four pins 43 are permanently connected at their upper ends to cylindrical rods 45 which are slidably mounted in guides made in lugs 46 cast integral with and extending downwardly from the plate 8. Below the cylindrical openings which pass the rods 45 the guide lugs 46 are longitudinally slotted and each of the rods 45 has a pin 47 connected thereto extending downwardly into a slot thus preventing any rotation of the rods 45 about their longitudinal axes. The rods 45 are located in the same horizontal plane with the cam member 13.

The cam member 13, as shown in Figs. 6, 7, and 8, has two projecting cams 13a of the shape shown and two projecting kick-out cams 13b. In the position of the cam member shown in Fig. 6 none of the cams 13a or 13b are engaged against the inner rounded ends of any of the rods 45. In this position of the cam the spring 38 will hold the rod 35 vertical as in Fig. 1 with the ball 41 in the cross slot of the H-slot 6. When the cam is in such neutral position the pins 34 are in the rearmost slots 29 directly in front of the lugs 27 as shown in Fig. 3.

On operating the selector pedal 33 and moving it forward, for example, so that the pins 34 enter the slots 29 immediately ahead of the rearmost slots 29 the cam 13 is turned. As shown in Fig. 7, a cam member 13a is engaged against one of the rods 45 and has moved the same outwardly so that the rod 35 is swung about its upper universal mounting and passes from the neutral position of the rod, as shown in Fig. 6, into one of the sides of the H-slot and is thereafter drawn in one direction lengthwise of the H-slot 6. The first movement of the rod carries the ball 41 at the lower end into a recess of one of the forks 2 or 3, while the continuing movement moves the fork longitudinally on the rod 4 with a corresponding connection of the selected gears for getting a selected speed. It will be noted that in the movement of the cam from the position shown in Fig. 6 to that shown in Fig. 7 the kick-out cam 13b located very nearly opposite the right-hand cam 13a has been moved beyond the inner rounded end of the oppositely disposed rod 45, as shown in Fig. 7. Therefore, when, for example, the pedal 33 is tilted and returned to its original position, as in Fig. 3, to neutralize the gearing, the cam 13b moving in a counterclockwise direction engages against the end of said opposite rod 45 and partially moves the rod 35 and connected parts back to their initial position. The remainder of said movement back to initial position is effected by the spring 35. The kick-out movement imparted by the cam 13b is one under the control of the operator and, therefore manually applied, giving an impulse of return of the parts to initial position which is completed by the force of the spring 38.

The operation of the cam when the selector pedal is moved to other slots 29 need not be specifically described. In Fig. 8 there has been shown a much further movement so that the cam 13a at the right in Fig. 6 has been swung around to engage another arm 45. Likewise, the cam may be swung in the opposite direction. In any case when the selector pedal 33 is moved so that the pins 34 enters selector slots 29 or 28 the corresponding cam operation of a rod 45 to make the selected gear shift movement occurs.

With my invention the mechanism described may be attached to the upper side of a transmission gearing housing and to a chassis frame member at one side thereof as illustrated, that part of the gear shifting lever which extends upwardly into the driving compartment being eliminated. When the selector pedal is also used to operate the clutch, the operation of the pedal for selecting simultaneously disengages the clutch so that gear shifting takes place with the gearing disconnected from the engine.

With this invention efficient selected gear shifting is attained in a simple and practical manner. The invention is defined in the appended claims and is to be considered comprehensive of all forms of structure coming within their scope.

I claim:

1. A mechanism of the class described, a vertically positioned housing adapted to turn about a vertical axis, a shifting rod mounted at its upper end on said housing for universal movement and extending vertically therethrough, means for selectively turning said housing to anyone of a number of predetermined positions, and means on said housing combined with means interposed between said last mentioned means and the shifting rod for shifting the rod to selected positions in accordance with the poistions to which the housing is turned.

2. In a mechanism of the class described, a suport, a housing mounted on the support for turning movement about a vertical axis, means for turning said housing to any one of a number of predetermined positions, a cam secured to said housing and movable therewith, a shifting rod extending through the housing, means for mounting the shifting rod for universal movement at its upper end, and means connected with the rod actuated by said cam on turning movement of the housing for shifting the rod to a predetermined position in accordance with the position to which said housing is turned.

3. A construction containing the elements in combination defined in claim 1 combined with spring means acting on the rod and tending to return the same to initial position.

4. A construction containing the elements in combination defined in claim 1, wherein said means for turning the housing comprises a gear fixed to the housing, a gear in mesh therewith, means for mounting said last mentioned gear for turning movement, a foot pedal and means interposed between the foot pedal and the last mentioned gear for operating the same to predetermined position on movement of the foot pedal to selected positions.

5. A construction containing the elements in combination defined in claim 1, wherein said means for turning said housing comprises a shaft, a rod fixed to said shaft, a pedal pivotally mounted at the upper end of the rod, fixed plates having spaced recesses therein between which said rod moves, means on the pedal adapted to engage in selected recesses in said plate on movement of the pedal and attached rod to different selected positions, and gearing means between said shaft and the housing for turning the housing on operating said shaft through said rod and pedal.

6. In a construction of the class described, a transmission gearing including two shifting forks having recesses therein, a housing including a cover plate mounted adjacent the transmission gearing, a hollow member mounted to turn about a vertical axis on said cover plate and extending therethrough, a shifting rod extending through said hollow member and mounted thereon at its outer end for universal movement, yielding means normally holding said shifting rod in neutral position, means for selectively rotating said hollow member to any one of a plurality of predetermined positions, and cooperating means connected to the shifting rod and to the inner end of said hollow member whereby rotation of said hollow member moves said shifting rod at its inner end into connection with a selected shifting fork, and thereafter moves the shifting fork to effect a connection of gearing in the transmission gearing in accordance with the predetermined position to which said hollow member is rotated.

7. A construction containing the elements in combination defined in claim 6, wherein said cooperating means on the hollow member and said shifting rod comprises a cam attached to the inner end of the hollow member within said cover plate, a disk on said rod, a plurality of guide rods mounted on the inner side of said cover plate in the path of movement of said cam, and connections between the guide rods and the disk, as and for the purposes specified.

8. In a mechanism of the class described, a selective transmission gearing, a rotatably mounted shaft, a rod secured thereto, a foot pedal pivotally mounted at the upper end of the rod, spaced plates having spaced apart notches in their upper edges, ears extending downwardly from the foot pedal, pins on said ears adapted to be received in said notches in said plates upon selective movement of the foot pedal to predetermined positions whereby said shaft is rotated predetermined amounts in accordance with the selective movement of the pedal, and means operated by said shaft for selectively shifting gears in the transmission in accordance with the movements of the shaft.

9. In a gear shifting mechanism, a supporting cover plate, a hollow housing rotatably mounted on said cover plate about a vertical axis, a vertically positioned shifting rod extending through said housing and having a universal mounting thereon at its outer end, means for selectively turning said housing about its vertical axis predetermined amounts, a cam secured to the inner end of the housing having two spaced apart radially extending cam members, rods mounted on the cover plate and having inner ends in the same plane with said cam members whereby a rod is longitudinally moved when a cam member engages thereagainst, and connecting means between each of said rods and the said shifting rod whereby the shifting rod is selectively moved to different positions in accordance with the predetermined rotation of said housing.

10. A construction containing the elements in combination defined in claim 9, said cam member having in addition two spaced apart kick-out cams acting on said rods to move said shifting rod to neutral position.

11. The combination with a conventional type of gear shift mechanism having a lever universally movable to different positions to shift the gears of said mechanism, of a rotatable edge cam, means for manually rotating said cam, and means including a plurality of slidably mounted rods, actuated by rotation of said cam acting to move said lever to different gear shifting positions.

12. The elements in combination defined in claim 11 in which said means for manually rotating said cam comprises a manually movable pedal and means for rotating said cam by movement of said pedal.

WALTER E. BASSETT.